US 6,711,402 B1

(12) United States Patent
Chelliah et al.

(10) Patent No.: US 6,711,402 B1
(45) Date of Patent: Mar. 23, 2004

(54) METHOD AND APPARATUS FOR DISPLAYING CALLING PARTY INFORMATION

(75) Inventors: Sivananthan Chelliah, Plano, TX (US); John Visser, Nepean (CA)

(73) Assignee: Nortel Networks Ltd., St. Laurent (CA)

( * ) Notice: Subject to any disclaimer, the term of this patent is extended or adjusted under 35 U.S.C. 154(b) by 0 days.

(21) Appl. No.: 09/129,909

(22) Filed: Aug. 6, 1998

Related U.S. Application Data

(60) Provisional application No. 60/054,865, filed on Aug. 6, 1997.

(51) Int. Cl.[7] .............................. H04Q 7/20; H04Q 7/38
(52) U.S. Cl. .............. 455/415; 455/422.1; 455/414.01; 379/142.01; 379/142.08; 379/142.03; 379/142.04
(58) Field of Search ................................. 455/566, 412, 455/413, 415, 403, 439, 445, 550, 552, 560, 517, 422.01, 414.01; 379/142, 142.01, 142.08, 142.03, 142.04

(56) References Cited

U.S. PATENT DOCUMENTS

| 5,559,860 | A | * | 9/1996 | Mizikovsky | 455/415 |
|---|---|---|---|---|---|
| 5,752,195 | A | * | 5/1998 | Tsuji et al. | 455/415 |
| 5,758,279 | A | * | 5/1998 | Foti | 455/413 |
| 5,764,731 | A | * | 6/1998 | Yablon | 455/412 |
| 5,784,444 | A | * | 7/1998 | Snyder et al. | 379/142 |
| 5,883,943 | A | * | 3/1999 | Siddiqui | 455/425 |
| 5,930,701 | A | * | 7/1999 | Skog | 455/415 |
| 6,006,087 | A | * | 12/1999 | Amin | 455/413 |
| 6,052,592 | A | * | 4/2000 | Schellinger et al. | 455/445 |
| 6,061,560 | A | * | 5/2000 | Saboorian et al. | 455/415 |
| 6,075,984 | A | * | 6/2000 | Murata | 455/415 |

* cited by examiner

*Primary Examiner*—William Trost
*Assistant Examiner*—Keith Ferguson
(74) *Attorney, Agent, or Firm*—James A. Harrison; Bruce E. Garlick

(57) ABSTRACT

A mobile station in a cellular telecommunication network includes an apparatus and method for storing a calling party identification signal. This calling party identification signal is transmitted to an originating MSC along with the call set up signals. The originating MSC then transmits the calling party identification signals to an HLR which transmits them to a serving MSC for delivering to the called party mobile station. Accordingly, the method and apparatus support the delivery of calling party identification signals to the called party without requiring the creation and maintenance of databases for storing such information. The mobile station as well as the MSCs adaptive to store the calling party information signals and to receive and transmit the same. The communication signal definitions between the mobile stations MSCs base stations HLRs and VLRs are all adapted to include and support the transmission of the calling party identification signals which are permanently stored in the mobile station.

13 Claims, 5 Drawing Sheets

METHOD AND APPARATUS FOR DISPLAYING CALLING PARTY INFORMATION

CROSS REFERENCE TO RELATED APPLICATION

This application claims priority to U.S. Provisional Application Ser. No. 60/054,865, filed Aug. 6, 1997, which is incorporated herein by reference in its entirety for all purposes.

TECHNICAL FIELD OF THE INVENTION

This invention relates to the field of telecommunication networks and, more particularly, to delivering calling party information to a called party receiving a given call in a wireless telecommunication network.

BACKGROUND OF THE INVENTION

Until recently, the only information provided to a called party to indicate that a call was being terminated on his or her wireless transceiver unit or mobile station was a ring tone and perhaps a flashing light. Recently however, newer networks in certain parts of the country have supported enhanced calling party identification as a subscriber feature. For example, a Calling Numbered Display and Recording System (CNDR) provides an apparatus which integrates customer—owned telephone equipment with the calling party identification service (CNDR). CNDR adds signals to the central telephone switching office signals that are conveyed on a telephone line between the central office and a called party's telephone system. The CNDR signals that are added include calling party information such as the telephone number and area code of the telephone or mobile station that is initiating the call. Other information, such as the caller's name, is generally not provided by CNDR at the present time. CNDR is being implemented in many local exchange carrier (LEC) markets as they become equipped with out-of-band signaling such as Signaling System 7 (SS7). The SS7 protocol is described in communications research ("Belcore") documents TR-TSY-000030/000031, dated November, 1988. Phone utilities as well as independent companies such as General Telephone and Electronics (GTE) have implemented CNDR on SS7 switched exchanges.

Existing CNDR systems allow a called party to see the telephone numbers of the last caller or number of callers on integrated telephone receiver displays. Currently, the SS7 switched exchanges only provide the calling party number for display by the called parties telephone system. Accordingly, some telephone systems have been developed to allow a called party to program a telephone system to display a name or nickname of a calling party whenever the calling party's number is received from a switched exchange. The problem with this approach, however, is that a called party must enter the calling party name for every person or organization for which the called party wants a name to be displayed. As may readily be seen, such an approach is highly inefficient in that a significant programming effort to display calling party name information must be repeated by every individual that wishes to have a calling party name displayed for calls from known people and organizations. This solution is grossly insufficient, because so much duplicate programming occurs among the many called parties known by each calling party.

In response to such gross inefficiencies, current proposals exist to establish a database within the SS7 switched exchange or telephone network for maintaining calling party names. Under such proposals, whenever a calling party number is received and a call is to be routed to a called party, the SS7 switched exchange must access the database to match the calling party name information with the calling party number so that the calling party name information maybe transmitted to the called party. From the prospective of the called party, such an approach is beneficial because it eliminates the need for the called party to individually program every calling party name that it wants displayed. From the perspective of the telephone service provider, however, this service is expensive because it requires additional hardware (ie. database and additional hardware for storing large databases). This approach is even more expensive to the service provider because it requires significant effort in maintaining the accuracy of the calling party name records in the database. What is needed, therefore, is a system and apparatus which eliminates the need for the service provider to develop and maintain calling party name databases and the need for the called party to program calling party names into his or her telephone equipment.

SUMMARY OF THE INVENTION

A mobile station includes hardware and logic circuitry for receiving and permanently storing calling party identification signals. For example, the calling party identification signal may represent the calling party's name, nickname or trademark. The logic circuitry within the mobile station prompts the mobile station to transmit the stored calling party identification signals along with other call origination signals whenever the call is being placed from the mobile station to a mobile switching center (MSC) by way of a base station (BS). The originating MSC includes logic circuitry and hardware for receiving, extracting and temporarily storing the calling party identification signals. The originating MSC also transmits the calling party identification signals in its communications with other devices to establish the call. In a preferred embodiment, the originating MSC transmits the calling party identification signals along with location request signals that it transmits to a home location register (HLR) to determine the serving system for the called party.

The HLR is adapted to receive a location request signal which contains the calling party identification signals, to extract the calling party identification signals, and then to transmit the extracted information to the serving system MSC. The calling party identification signals are transmitted along with routing request signals. Accordingly, the serving MSC receives the calling party identification signals directly from the HLR of the originating system in a IS-41 system. This allows the serving MSC to transmit the calling party identification signals to the called party mobile station along with the alert signals that are used to prompt a phone to notify the called party that a call is being routed to it. As may be seen, therefore, the serving MSC can provide the calling party name, nickname, or trademark without having to search a dedicated database. Moreover, this invention allows a temporary user of a mobile station to enter a given name or nickname or trademark into the phone for delivery to the called party prior to making the call. Such a feature thus enhances personal mobility concepts which are currently being emphasized throughout the telecommunications industry.

DESCRIPTION OF THE PREFERRED EMBODIMENT

Figure 1:
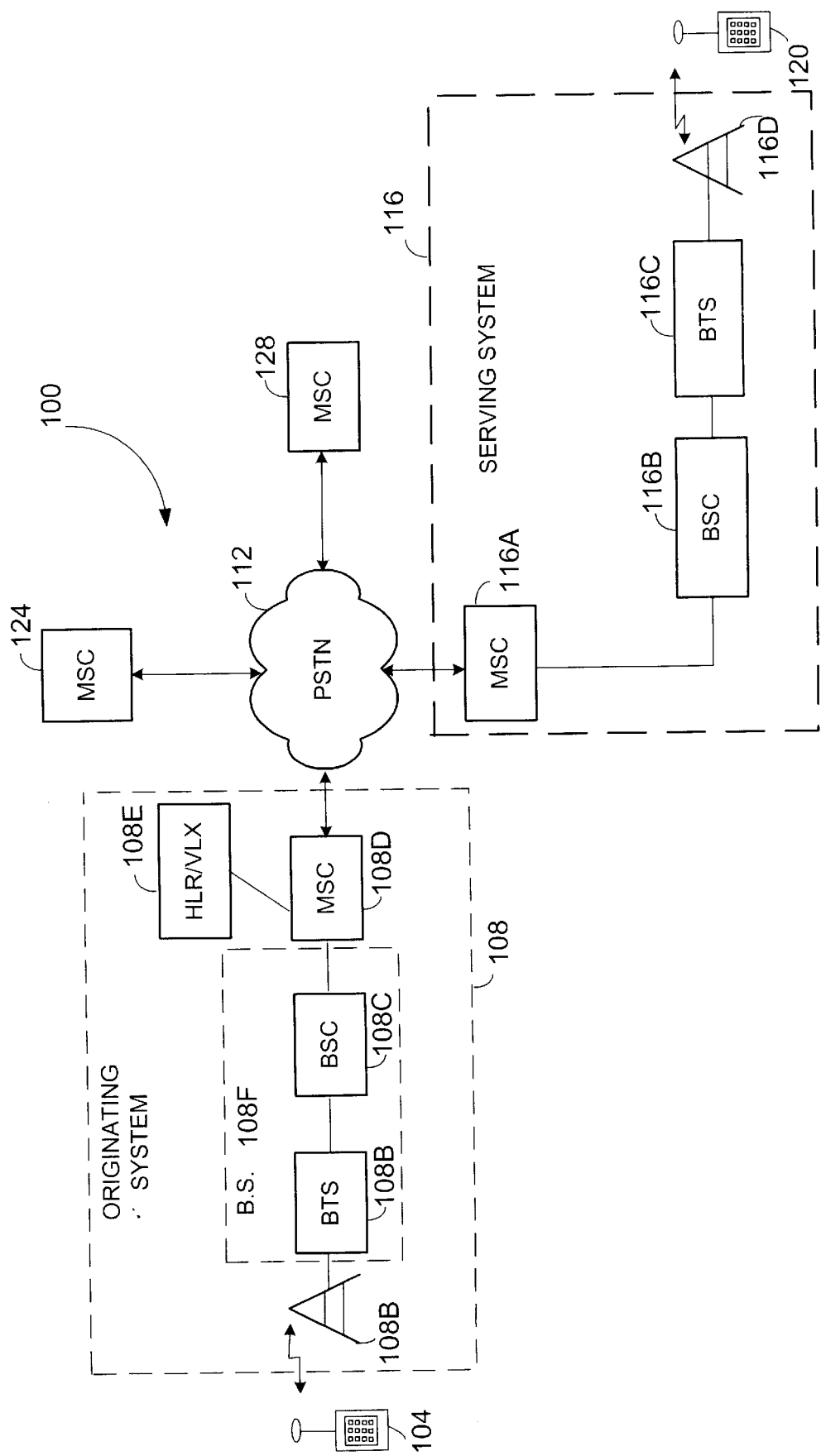
FIG. 1 is a functional block diagram of a wireless communication network in which a mobile station served by an originating system communicates with a mobile station served by a receiving system.

FIG. 1 is a functional block diagram of a wireless communication network in which a mobile station served by an originating system communicates with a mobile station served by a receiving system. Referring now to FIG. 1, the wireless communication network, shown generally at 100, includes a mobile station 104 which communicates with originating system 108 to place a call through the public switch telephone network (PSTN) 112 to serving system 116 for termination (delivery) to mobile station 120. As may be seen, originating system 108 includes an antenna 108A which is connected to BTS 108B which in turn is connected to BSC 108C which is in turn connected to mobile switching center (MSC) 108D. MSC 108D is connected to PSTN 112 for routing calls to or from other MSCs. Additionally, MSC 108D is connected to HLR/VLR 108E. BTS 108B is a base transceiver station which serves primarily to transmit and receive communication signals through antenna 108A for communicating with mobile stations. Base station controller BSC 108C serves primarily to control BTS 108B. Collectively, BTS 108B and 108C may be referred to as Base Station (BS) 108F. BS 108F communicates with MSC 108D. MSC 108D serves primarily to determine call routing and to route calls being generated by originating system 108. As may be seen, MSC 108D also is connected to HLR/VLR 108E. An HLR is a home location register which contains information regarding all mobile stations that are assigned to originating system 108. HLR/VLR 108E also includes location information (addresses) of mobile stations served by other MSCs. A VLR serves to maintain information about all mobile stations currently present within the serving area for originating system 108. Similar to originating system 108, serving 116 includes an MSC 116A which is connected to a BSC116B which in turn is connected to a BTS 116C which is connected to antenna 116D. Antenna 116D is an electronic communication with mobile station 120.

In operation, a mobile station 104 originates a call to a mobile station outside of the originating system, MSC 108D examines the contents of HLR 108E to determine routing information to the receiving or serving system. In the system shown in FIG. 1, the call is routed to MSC 116A of serving system 116. While the system of FIG. 1 shows that the originating system communicates with the serving system through PSTN 112, it is understood that alternate networks include the use of direct links between the plurality of systems. Thus, by way of example, MSC 108D maybe connected to each of the other MSCs through a private network formed of fiber optic cable or T1 lines.

Mobile station 104 transmits call origination signals to BS 108F through antenna 108A. BS 108F performs common base station processing on the received call origination signals and transmits the call origination signals, perhaps in a modified form, to MSC 108D. The processing by BS 108F is standard and well known to those skilled in art. MSC 108D then performs routine call routing steps to determine which MSC is a part of the serving system for the called party. As may be seen for example, the called party could be served either by MSC 116A, MSC 124 or MSC 128 in the network of FIG. 1. The method of determining call routing and, more specifically, to determine that MSC 116A is the MSC of the serving system for the called party also is standard and well known by those skilled in art. More particularly, MSC 108D communicates with HLR/VLR 108E to determine the location of mobile station 120 and then routes the call through PSTN 112 to the serving system 116. More specifically, MSC 108D transmits call set up signals to MSC 116A to route the call through serving system 116 to the called party's at MS120.

Figure 2:
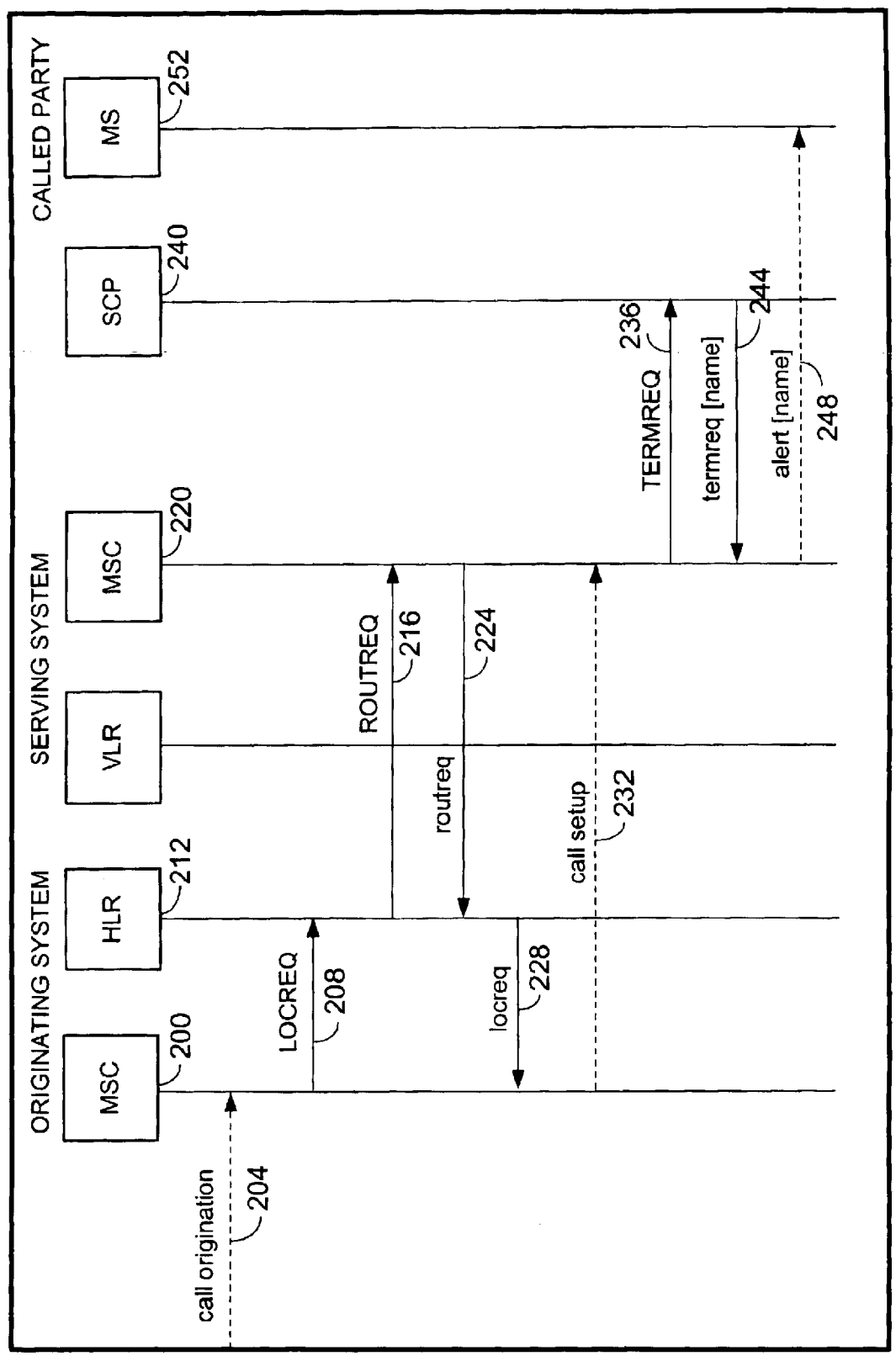
FIG. 2 is a signal sequence diagram which reflects a proposal for delivering calling party name to a mobile station.

FIG. 2 is a signal sequence diagram which reflects a proposal for delivering calling party name to a mobile station. Referring now to FIG. 2, MSC 200 receives a call origination signal 204 from a base station that received the call origination signals originally transmitted by a mobile station. A call origination signal is a signal which contains information regarding a call which is being placed by one mobile station and is to be routed to another through a wireless communication network. For example, a call origination signal includes an identification of the calling party and an identification of the called party. Upon receiving call origination signal 204, MSC 200 transmits, in the preferred embodiment, a LOCREQ signal to HLR 212 to determine the location of the called party mobile station A LOCREQ signal is one whose purpose, at least partially, is to request location and routing information. Responsive thereto, HLR 212 transmits a ROUTREQ 216 signal to the serving system MSC 220 to obtain a temporary location directory number (TLDN). A TLDN is used for routing a call. The serving system MSC then returns a routreq 224 signal back to the originating system HLR. The routreq 224 signal includes the TLDN. Responsive thereto, HLR 212 transmits a locreq signal 228 to MSC 200.

Once MSC 200 has received the locreq signal 228, it transmits call set up signals 232 to MSC 220. Responsive thereto MSC 220 transmits a TERMREQ signal 236 to service control point (SCP 240) to obtain the calling party name. Upon receiving the TERMREQ signal 236, SCP 240 transmits termreq signal 244 back to MSC 220. The termreq signal 244 includes a field for containing the calling party name. Upon receiving the termreq signal 244 with the calling party name, MSC 220 transmits an alert signal 248 to mobile station 252. Alert signal 248 includes the calling party name. Upon receiving the calling party name in alert signal 248, mobile station 252 extracts the calling party name from the alert signal 248 and presents it to the called party. As may be seen, this proposal includes the creation and maintenance of a database within SCP 240 with a mapping between calling party Numbers and calling party names.

Figure 3:
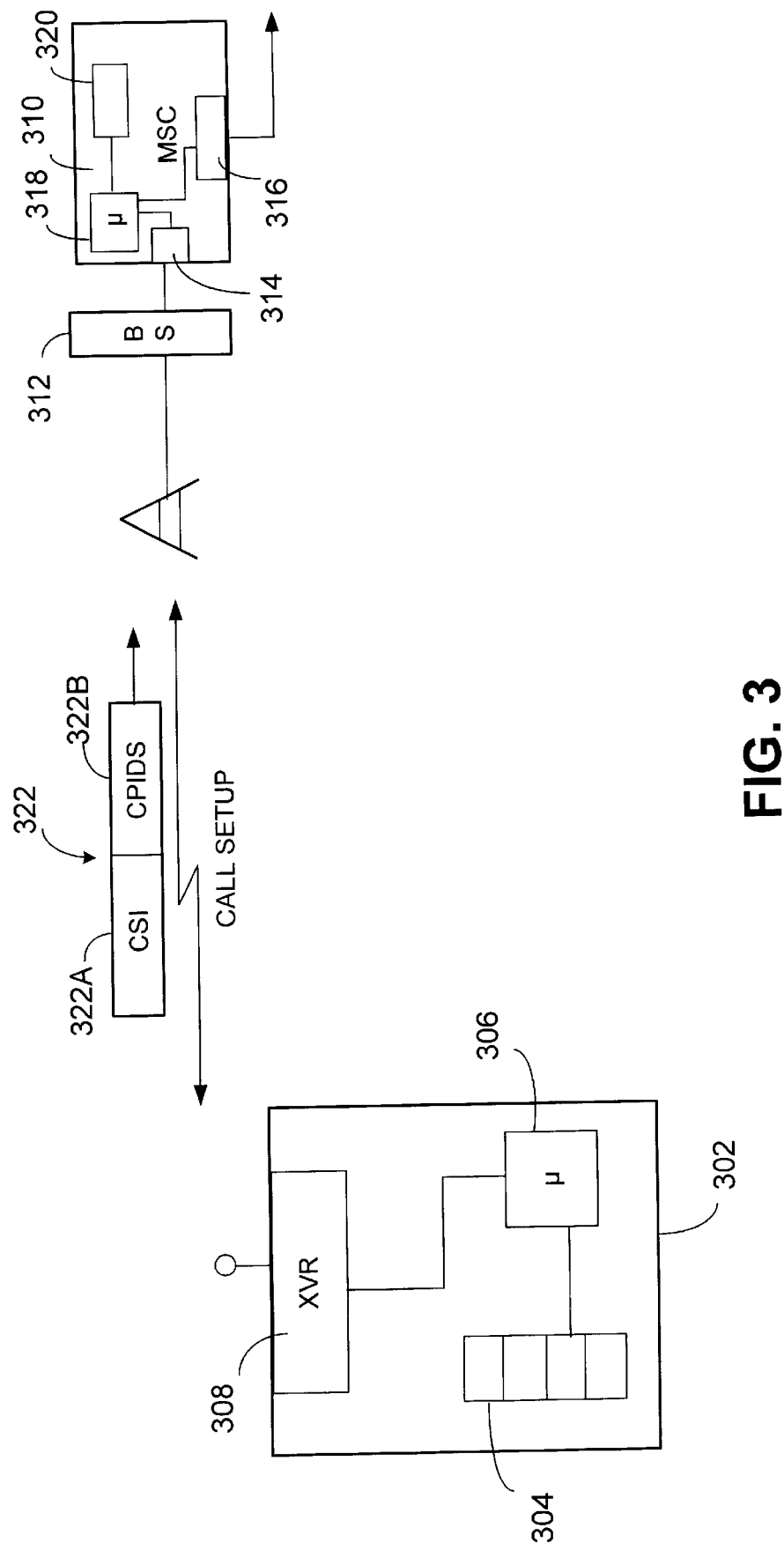
FIG. 3 is a functional block diagram of a communication network in which a mobile station is in communication with an originating MSC.

FIG. 3 is a functional block diagram of a communication network in which a mobile station is in communication with an originating MSC. Referring now to FIG. 3, mobile station 302 includes a store 304 which is connected to a processing unit 306, which in turn is connected to a tranceiver 308. Mobile station 302 serves to transmit and receive communication signals with serving system MSC 310 by way of a base station system 312. The MSC 310 includes a first tranceiver 314 for communicating with base station 312 and a second tranceiver 316 for communicating with other networks or devices. By way of example, tranceiver 316 may be used to communicate with another MSC either directly through a dedicated line, by way of example a T1 line, or by means of the public switch telephone network. Each of the transceivers 314 and 316 are connected to the processing unit 318 which in turn is connected to a store 320. Store 320 is for storing the calling party identification information received from a mobile station. In the preferred embodiment, store 320 in a store adapted for temporarily storing the called party identification information. The call set up signals transmitted by mobile station 302 shown generally at 322. Call set up signals 322 include a first portion for carrying call set up information (CSI 322A) and a second portion for carrying calling party identification signals (CPIDS 322B.)

Store 304 of mobile station 302 is for storing the CPIDS 322B signals. The CPIDS 322B signals maybe stored and transmitted in many forms. By way of example, store 304 can store a plurality of ASCII digits which represent the calling party name, nickname or trademark. Accordingly, during call set up, processing unit 306 extracts the CPIDS 322B from store 304 and transmits the same to BS 312 in call set up signals 322 during the call set up process. MSC 310, upon receiving call set up signals 322 through transceiver 314 from the base station 312, extracts the CPIDS 322B and stores it in temporary store 320 for later transmission to the called party once the call is set up.

Figure 4:
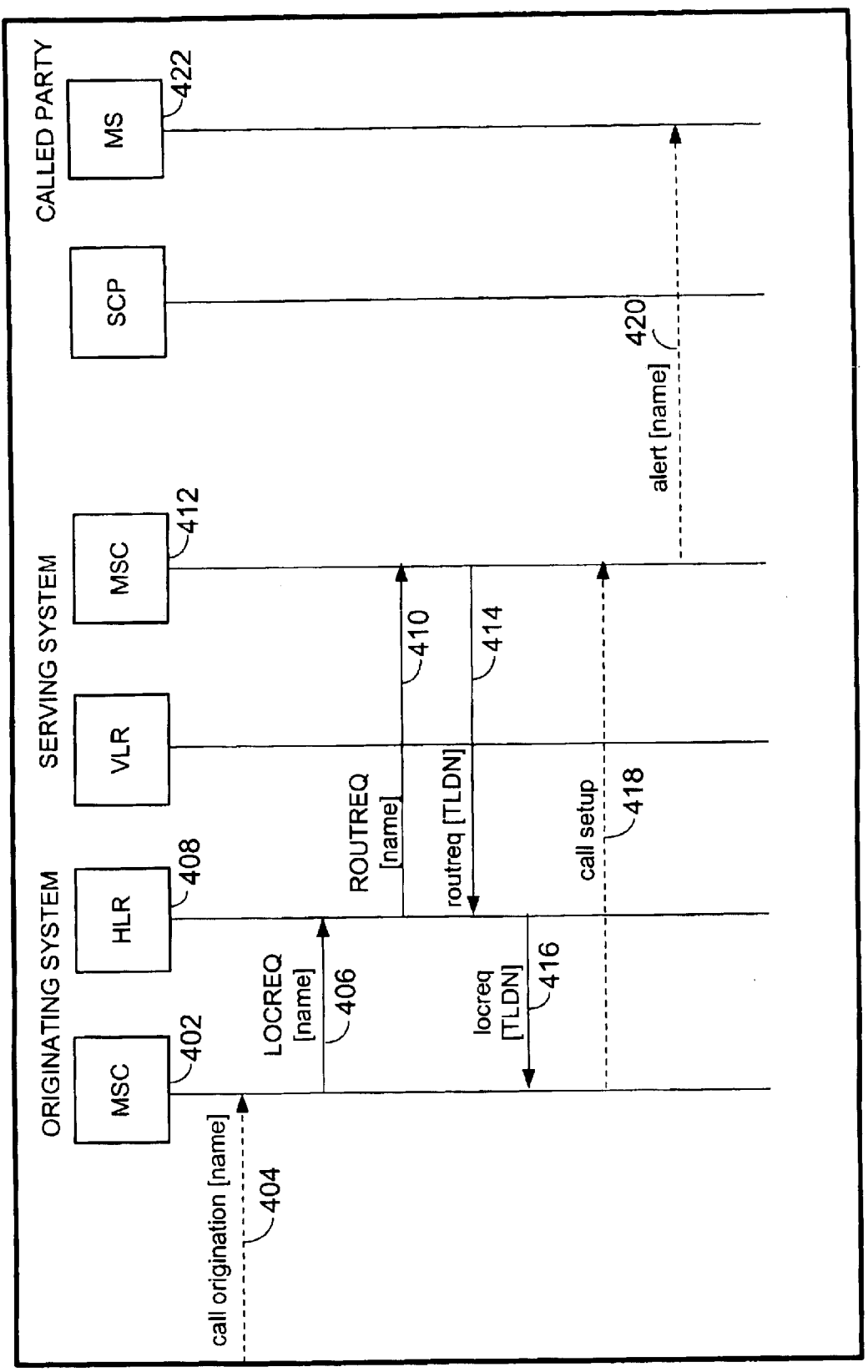
FIG. 4 is a signal flow diagram that illustrates call set up according to a preferred embodiment of the invention.

FIG. 4 is a signal flow diagram that illustrates call set up according to a preferred embodiment of the invention. Referring now to FIG. 4, MSC 402 receives call origination signal 404 from an originating mobile station by way of a base station (not shown). Call origination signal 404, in contrast to call origination signal 204, includes additional calling party information. More specifically, call origination signal 404 includes a field for carrying calling party information. The calling party information may be in many different forms. One preferred embodiment, the calling party identification signal includes the calling party name represented in ASCII form.

Upon receiving call origination signal 404, MSC 402 transmits a LOCREQ signal 406 to HLR 408. LOCREQ signal 406 includes the calling party identification signal (CPIDS). HLR 408, responsive thereto, transmits ROUTREQ signal 410 to MSC 412 of the serving system. ROUTREQ signal 410 also includes the CPIDS. Upon receiving the ROUTREQ signal 410, MSC 412 returns a routreq signal 414 which includes a TLDN. HLR 408, upon receiving routreq signal 414, transmits a locreq signal 416 to MSC 402. The locreq signal 416 also includes the TLDN. Upon receiving the locreq signal 416 which includes the TLDN, MSC 402 generates call set up signals 418 to MSC 412 to set up call. Upon receiving the call set up signals 418, MSC 412 transmits an alert signal 420 to MS 422. Alert signal 420 includes the CPIDS which was received earlier in the ROUTREQ signal 410.

MS 422, upon receiving the CPIDS, presents the CPIDS to the called party. In the preferred embodiment, the CPIDS comprises ASCII characters that represent the calling party's name, nickname or trademark. Accordingly, MS 422 displays alphanumeric text on the display screen, the text being the name, nickname or trademark of the calling party when MSC 412 receives the ROUTREQ signal 410 with the CPIDS. In operation, serving MSC 412 temporarily stores the CPIDS in relation to a calling party ID. For example, MSC 412 may store the received CPIDS and may map it to a mobile ID number (MIN) of the calling party MS. Accordingly, when a call set up signal 418 is received which identifies the calling party by means of, by way of example, the MIN, MSC 412 may use the MIN received in the call set up signal 418 to identify and extract the CPIDS that was stored in the temporary store. Thereafter, MS 412 appends the CPIDS to the alert signals 420 which are transmitted to MS 422 to complete the call set up. As may be seen, this invention avoids the need of having the MSC, here MSC 412 send request signals to SCP to obtain the calling party name (see signals 236 and 244 of FIG. 2). Alternatively, the TLDN may be used to map the calling party name or, CPIDS to the call set up signal.

Figure 5:
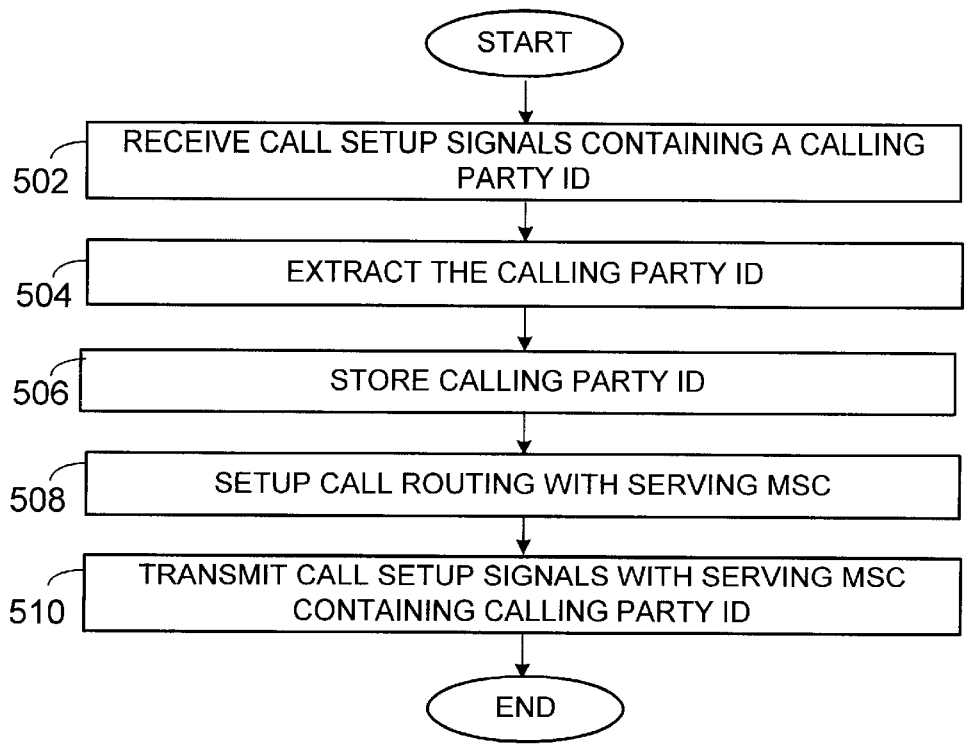
FIG. 5 is a flow chart illustrating a method in an MSC for receiving and transmitting calling party identification signals during call set up.

FIG. 5 is a flow chart illustrating a method in an MSC for receiving and transmitting calling party identification signals during call set up. Referring now to FIG. 5, an MSC, by way of example, MSC 310 of FIG. 3, receives call set up signals from a mobile station containing a calling party identification signal (step 502). The calling party identification signal may be found in many different forms including ASCII text which represents the calling party name or nickname. It is understood, that the calling party identification signal may be modified for many different uses. By way of example, the calling party identification signals may be used to carry the trademark of a business for identifying itself. Next, the MSC extracts the calling party ID signal from the call set up signals (step 504). Thereafter, the MSC stores the calling party ID in a store. In the preferred embodiment, the store is for storing the calling party ID temporarily (step 506). In an alternate embodiment, however, the calling party ID maybe stored on a more permanent basis. (step 506) for example, the MSC may be adapted to generate a log for calls of the calling party or of the called party. Thereafter, the MSC initiates call routing procedures to identify the serving MSC and route the call to it. (step 508) Finally, the originating MSC transmits set up signals to the serving MSC to prompt the serving MSC to connect the call to the mobile station by transmitting an alert signal containing the calling party ID (step 510).

Figure 6:
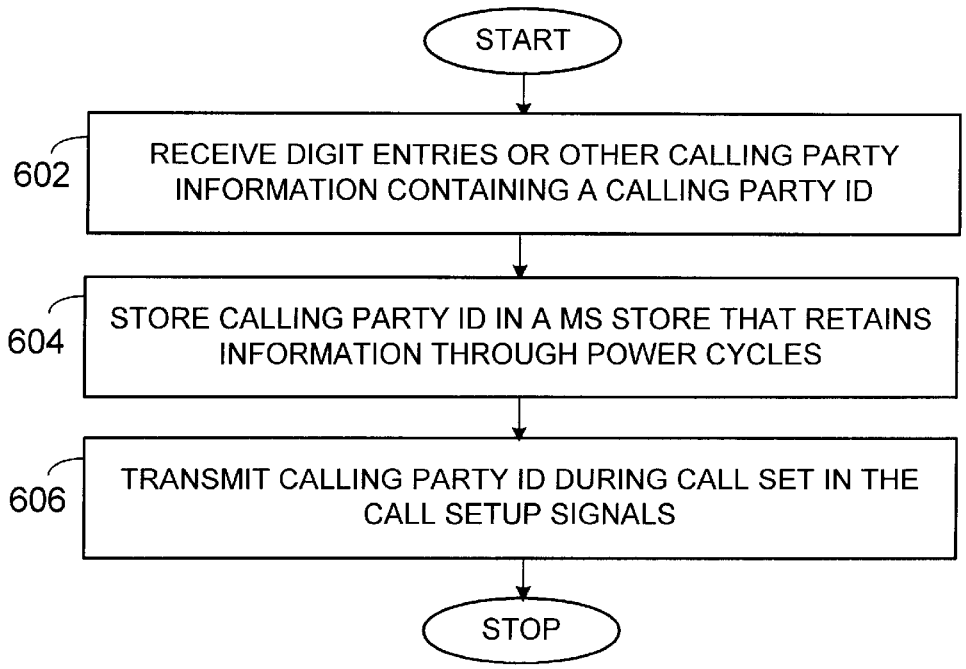
FIG. 6 is a flow chart illustrating a method in a mobile station for receiving, storing and transmitting calling party identification signals.

FIG. 6 is a flow chart illustrating a method in a mobile station for receiving, storing and transmitting calling party identification signals. Referring now to FIG. 6, the method which is shown illustrates a preferred embodiment of receiving calling party information signals. The calling party ID, in the preferred embodiment, is in the form of a name, a nickname or a trademark. It is understood, however; that other types of calling party identification signals may be entered, stored and transmitted by the mobile station. Initially, the mobile station must receive the calling party ID (step 602). If for example, the calling party ID is the calling party's name and is entered through the MS keypad, the mobile station receives digit entries made upon the mobile station key pad, which digit entries represent the mobile station subscriber name, nickname or trademark. Thereafter, the mobile station stores the calling party ID in a store having the capacity to maintain the calling party ID through mobile station power cycles (step 604). Thereafter, the mobile station transmits the stored calling party ID during call set up in the call set up signals whenever a new call is being originated by the mobile station (step 606).

Although the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A mobile station, comprising:

circuitry for receiving and permanently storing its own calling party identification;

circuitry for receiving and temporarily storing a called party number; and logic circuitry for transmitting the permanently stored calling party identification information within a call setup signal during call routing at a time prior to call connection without requiring the calling party to enter more information than the called party number.

2. The mobile station of claim 1 further including a keypad to enable a user to enter its own calling party information.

3. The mobile station of claim 2 wherein said circuitry for receiving and storing its own calling party identification includes logic circuitry to interpret keypad entries.

4. The mobile station of claim 1 wherein said logic circuitry for transmitting its own calling party identification is adapted to transmit call setup signals according to known signaling formats.

5. The mobile station of claim 1 wherein said logic circuitry for transmitting its own calling party identification is adapted to transmit call setup signals which include known signaling formats as well as an appended signal including its own calling party identification.

6. An originating mobile switching center (MSC), comprising:

circuitry for receiving, prior to call connection and during call routing, a call setup signal which includes a calling party identification originated by a mobile station;

circuitry for extracting and temporarily storing the calling party identification which calling party identification was entered by the calling party at a time unassociated with the transmission of the call setup signals that are received by the originating mobile switching center; and logic circuitry for selectively transmitting the calling party information including the calling party's own calling party identification to a serving MSC along with routing (location) request signals wherein the MSC does not initiate a lookup to determine calling party identification that it routes as a part of call setup.

7. A method for delivering calling party information to a called party, comprising:

receiving, in a mobile switching center prior to a call connection and during call routing, calling patty information signals including a mobile station's own calling party ID that was transmitted by a mobile station, which mobile station's own calling party ID was permanently stored;

extracting the mobile station's own calling party ID;

temporarily storing the mobile station's own calling party ID; and transmitting the mobile station's own calling party ID to a serving MSC during call setup and routing and prior to call connection without initiating a lookup to determine a calling party ID that is transmitted as a part of the call setup signals.

8. The method of claim 7 further including the step of transmitting the mobile station's own calling party ID to the serving MSC along with at least one call setup signal.

9. The mobile station of claim 1 wherein the mobile station's own calling party identification includes ASCII digits that form text identifying one of a calling party name, nickname, or a calling party trademark.

10. The mobile station of claim 1 further including memory for permanently storing the mobile station's own calling party identification for transmission during call set up.

11. The mobile switching center of claim 6 further including memory for storing a mobile station's own calling party identification in the form of alphanumeric text representing one of a calling party name, nickname or trademark.

12. The method of claim 7 wherein the mobile station's own calling party ID comprises ASCII text.

13. The method of claim 7 wherein the mobile station's own calling party ID is an alphanumeric representation of one of a calling party name, nickname, or trademark.

* * * * *